March 19, 1929.  H. O. SIEGMUND  1,705,944
ELECTROLYTIC DEVICE
Filed Sept. 2, 1926
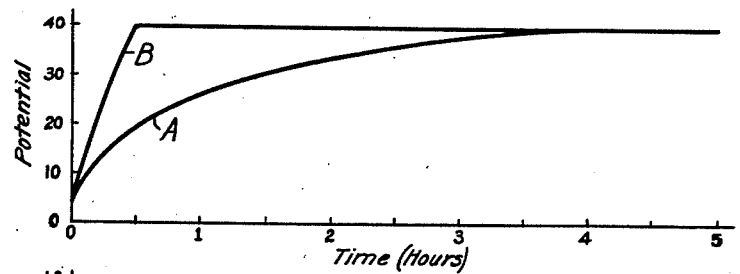
Fig.1
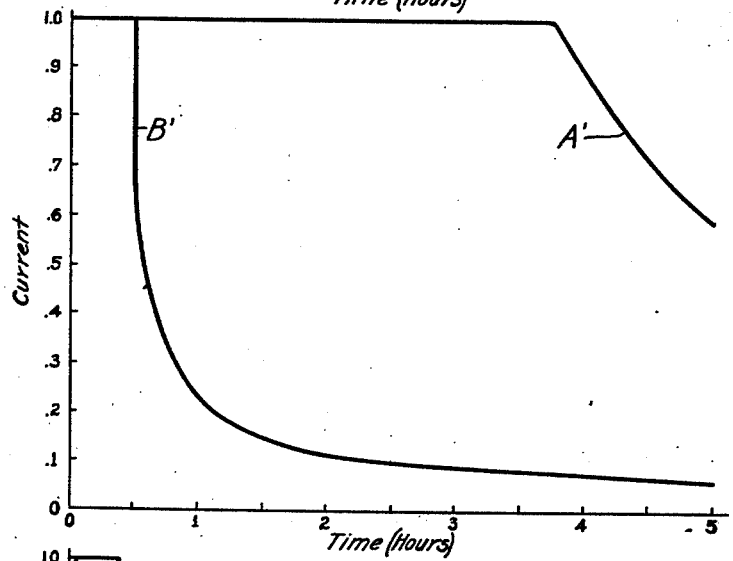
Fig.2
Fig.3
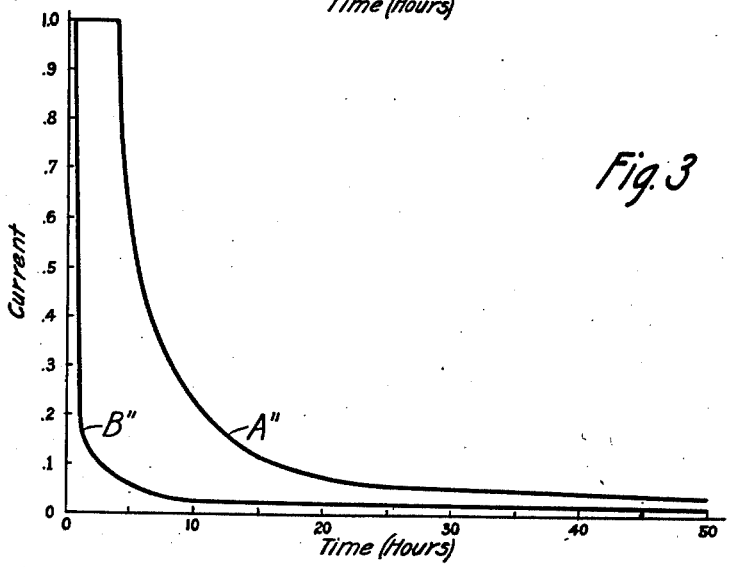
Inventor:
Humphreys O. Siegmund
by　　　　　Atty.

Patented Mar. 19, 1929.

1,705,944

UNITED STATES PATENT OFFICE.

HUMPHREYS O. SIEGMUND, OF WEST ORANGE, NEW JERSEY, ASSIGNOR TO WESTERN ELECTRIC COMPANY, INCORPORATED, OF NEW YORK, N. Y., A CORPORATION OF NEW YORK.

ELECTROLYTIC DEVICE.

Application filed September 2, 1926. Serial No. 133,118.

This invention relates to electrodes for electrolytic devices and particularly to a process for cleaning such electrodes.

It is an object of the invention to improve the operating characteristics of electrolytic devices and to increase their useful life.

A specific object is to increase the resistance of the dielectric film of an electrolytic condenser and to decrease the time required for its formation.

It is well known that in electrolytic cells, the condenser action, the current directional effect, etc., are due to a dielectric film formed on one of the electrodes. This film may be formed chemically or electrochemically but in either case it is essential that the electrode, on which the film is to be formed, be clean on the surface and free from contaminating impurities.

In the manufacture of electrolytic devices, it has been the practice to clean the electrodes by dipping in saturated alkaline solutions and in concentrated acids. Because of the rapid and violent action of these chemicals the electrodes are maintained in the cleaning baths for only a short period. It has been found that in an electrolytic condenser employing these electrodes considerable time is required for the building up of the dielectric film to a desired value of resistance. This is presumably due to the deep penetration into the electrode of the concentrated cleaning solutions, which, apparently, are not completely removed even by thorough rinsing. Another difficulty encountered in condensers whose electrodes are cleaned by this method is that the dielectric breaks down over a large number of local areas after a relatively short period of use. This is believed to be caused by the corrosion of parts of the electrode resulting from the cleaning method employed.

In accordance with the present invention, the electrodes of an electrolytic device are cleaned by means of dilute chemicals in such a way that the dielectric film formed on one of these electrodes builds up to a relatively high value of resistance in a comparatively short period of time. This cleaning process moreover, considerably decreases corrosion of the electrodes, thus partly preventing the break down of the dielectric film and increasing the useful life of the device.

The invention may be more clearly understood by referring to the following detailed description and to the drawing, the curves of which show, comparatively, the operating characteristics of electrolytic condensers, the electrodes of which were cleaned by different methods, respectively.

The curves of Fig. 1 indicate the potentials which were applied across the electrodes of the condensers while forming the dielectric film.

The curves of Figs. 2 and 3 show the leakage current resulting from the potentials applied across the terminals of the condenser in accordance with the curves of Fig. 1.

In accordance with a preferred embodiment of this invention the electrodes are attached to a porcelain cover and are then dipped into the cleaning solutions which are contained in suitable vessels. In order to completely clean the electrodes and also the under side of the porcelain cover, the jars are entirely filled with the cleaning solution.

The cleaning solution to which the electrodes are first subjected is composed of potassium hydroxide, C. P. and distilled water, 5 gallons of water being used to each pound of the potassium hydroxide. The electrodes are permitted to remain in this solution, which is preferably maintained at a temperature of 70 to 100° F., for about 10 minutes after which they are rinsed in hot tap water. The electrodes are then immersed in a solution composed of concentrated nitric acid, hydrofluoric acid and distilled water, 5 gallons of water being used per pound of each of the two acids. The temperature of this solution is also preferably maintained at a temperature of 70 to 100° F. The electrodes are allowed to remain in this solution for about 5 minutes after which both the electrodes and the structure to which they are attached are thoroughly rinsed in hot tap water and then drained thoroughly. The electrodes are then rinsed in cold distilled water for about 10 minutes after which they are suspended until dry and inspected to make sure that they are free from all foreign matter. When cleaned, the electrodes are immersed in an electrolyte preferably composed of boric acid, ammonium hydroxide and distilled water in accordance with the disclosure of my copending application, Serial No. 758,574, filed December 29, 1924.

The dielectric film of the electrolytic condenser is preferably formed by maintaining an E. M. F. across the electrodes of such a voltage that the direct current flowing in the circuit is maintained constant until the maximum operating potential is reached. From this time on the E. M. F. is maintained constant and the current decreases as the resistance of the dielectric increases.

The curves of Fig. 1 show the potentials which were applied across the electrodes of condensers while forming the dielectric film. Curve A of Fig. 1 is for a condenser whose electrodes were cleaned by dipping first into a saturated solution of sodium hydroxide and then, after rinsing, into concentrated hydrofluoric acid, after which the plates were rinsed and dried. Curve B is for a condenser whose electrodes were cleaned in accordance with the present invention. The potentials applied to the electrodes of the condensers were maintained at such values that the leakage current remained constant at 1.0 ampere until a potential of 40 volts was reached, after which the potentials were maintained constant at 40 volts.

The curves of Figs. 2 and 3 show the variation, with respect to time, of the leakage current passing through the dielectric film of these condensers when the potentials indicated in the curves of Fig. 1 were applied to the electrodes. Curves A' and A'' correspond to curve A of Fig. 1 while curves B' and B'' correspond to curve B.

The advantage gained by cleaning the electrodes in accordance with the present invention may readily be ascertained from the curves. Curves B, B' and B'' indicate that, in forming the dielectric of the condenser, the electrodes of which were cleaned in accordance with the present invention, the maximum E. M. F. of 40 volts was reached in about ½ hour and with this potential applied across the electrodes, the direct current leakage was reduced to about 0.1 ampere after approximately 2½ hours of operation. Curves A, A' and A'' indicate that under the same operating conditions, when employing the condenser whose electrodes were cleaned in the concentrated baths, almost 4 hours were required to reach the maximum operating voltage and about 17 hours to reach a direct current leakage of about 0.1 ampere. In comparing the leakage current of the two condensesrs after a period of 50 hours, we find, from the curves of Fig. 3, that the current flowing through the condenser whose electrodes were cleaned in accordance with the present invention was reduced to about .01 ampere while the current in the other condenser reached a value of about .03 ampere. The two curves, moreover, converge as the time is increased beyond the time at which the maximum operating E. M. F. has been reached in the case of both condensers. For small periods of time, therefore, the ratio of leakage current indicated by curve A' to that indicated by curve B' is relatively large. It is to be noted, therefore, that in the condenser whose electrodes are cleaned in accordance with this invention, the time required for forming the dielectric film is relatively short and the leakage current at a given time is relatively low as compared with a condenser whose electrodes are cleaned by previously used methods. The cleaning process of this invention also has the advantage over other processes in that corrosion of the electrodes cleaned by the process of this invention is considerably reduced thus increasing the life of the condenser.

What is claimed is:

1. The method of cleaning the electrodes of an electrolytic device which consists in immersing the electrodes in an unsaturated solution of potassium hydroxide, rinsing in water, immersing in a second bath composed of equal parts of dilute nitric and hydrofluoric acids and rinsing in water.

2. The method of cleaning the electrodes of an electrolytic device which consists in immersing the electrodes for about 10 minutes in a bath composed of potassium hydroxide and distilled water in the approximate ratio of 5 gallons of water per pound of potassium hydroxide, this bath being maintained at a temperature of about 70 to 100° F., rinsing in water, immersing for about 5 minutes in a second bath composed of hydrofluric acid, nitric acid and distilled water in the ratio of one pound of each acid to 5 gallons of water, this bath being maintained at a temperature of about 70° to 100° F., and rinsing in water.

3. The method of cleaning the electrodes of an electrolytic device which consists in immersing the electrodes in a bath composed of potassium hydroxide and distilled water in the approximate ratio of five gallons of water per pound of potassium hydroxide, rinsing in water, immersing in a second bath composed of equal parts of dilute nitric and hydrofluoric acids, and rinsing in water.

4. The method of cleaning the electrodes of an electrolytic device which consists in immersing the electrodes in a bath composed of potassium hydroxide and distilled water in the approximate ratio of five gallons of water per pound of potassium hydroxide, immersing the electrodes in a bath of hydrofluoric acid, nitric acid, and distilled water in the approximate ratio of one pound of each acid to five gallons of water, and then rinsing the electrodes in water.

In witness whereof, I hereunto subscribe my name this 27th day of August, A. D., 1926.

HUMPHREYS O. SIEGMUND.